(12) United States Patent
Kaufmann et al.

(10) Patent No.: US 9,086,493 B2
(45) Date of Patent: Jul. 21, 2015

(54) HIGH-SENSITIVITY X-RAY DETECTOR

(71) Applicant: CSEM—Centre Suisse d'Electronique et de Microtechnique SA—Recherche et Developpement, Neuchâtel (CH)

(72) Inventors: Rolf Kaufmann, Zürich (CH); Peter Seitz, Urdorf (CH)

(73) Assignee: CSEM CENTRE SUISSE D'ELECTRONIQUE ET DE MICROTECHNIQUE SA-RECHERCHE ET DEVELOPPEMENT, Neuchatel (CH)

( * ) Notice: Subject to any disclaimer, the term of this patent is extended or adjusted under 35 U.S.C. 154(b) by 0 days.

(21) Appl. No.: 13/766,794

(22) Filed: Feb. 14, 2013

(65) Prior Publication Data

US 2013/0206994 A1    Aug. 15, 2013

Related U.S. Application Data

(60) Provisional application No. 61/599,185, filed on Feb. 15, 2012.

(51) Int. Cl.
*G01T 1/20*    (2006.01)
(52) U.S. Cl.
CPC .............. *G01T 1/2006* (2013.01); *G01T 1/2018* (2013.01)
(58) Field of Classification Search
CPC ............................ G01T 1/2006; G01T 1/2018
USPC ......................................................... 250/366
See application file for complete search history.

(56) References Cited

U.S. PATENT DOCUMENTS 5,541,402 A * 7/1996 Ackland et al. ............ 250/208.1
6,114,703 A   9/2000 Levin et al.
(Continued)

FOREIGN PATENT DOCUMENTS

EP    1161693    10/2009

OTHER PUBLICATIONS

Lotto, Synchronous and Asynchronous Detection of Ultra-Low Light Levels Using CMOS-Compatible Semiconductor Technologies, Doctoral Dissertation, Jul. 2010, University of Neuchatel, available for download at http://doc.rero.ch/record/22799, accessed on May 9, 2014.*

(Continued)

*Primary Examiner* — David Porta
*Assistant Examiner* — Jeremy S Valentiner
(74) *Attorney, Agent, or Firm* — Pearne & Gordon LLP

(57) ABSTRACT

A device for the sensitive detection of X-rays comprises a structured scintillator screen optically coupled to a semiconductor image sensor. The scintillator screen comprises individual columnar elements covered with material showing high optical reflection. Each columnar element represents a pixel, and light flashes created by an X-ray photon in a scintillating event exit through a short surface of the columnar element for detection with a semiconductor image sensor. The semiconductor image sensor comprises a multitude of photosensor elements, and one or more of these photosensor elements receives light from a scintillator screen pixel. Each photosensor element of the image sensor comprises a semiconductor volume where photocharge is created, a lateral drift-field device for the collection of photocharge, an electronic detection circuit for the conversion of collected photocharge packets either into proportional voltage pulses, into binary signals indicating the arrival of X-ray photons or into digital signals whose values correspond to the energy of the incident X-ray photons.

8 Claims, 3 Drawing Sheets

(56) References Cited

U.S. PATENT DOCUMENTS

| | | | |
|---|---|---|---|
| 2009/0008564 A1* | 1/2009 | Balan et al. | 250/366 |
| 2009/0212197 A1* | 8/2009 | Buttgen et al. | 250/208.1 |
| 2009/0315135 A1* | 12/2009 | Finkelstein et al. | 257/438 |
| 2010/0025589 A1* | 2/2010 | Olcott et al. | 250/363.03 |
| 2010/0051786 A1* | 3/2010 | Lotto et al. | 250/214 A |
| 2010/0109640 A1* | 5/2010 | Seitz | 324/76.38 |
| 2010/0264319 A1* | 10/2010 | Morichi et al. | 250/362 |
| 2011/0017918 A1* | 1/2011 | Baeumer et al. | 250/370.11 |
| 2011/0227632 A1 | 9/2011 | Lotto et al. | |
| 2013/0300838 A1* | 11/2013 | Borowski | 348/46 |
| 2014/0166861 A1* | 6/2014 | Schmitt et al. | 250/208.2 |

OTHER PUBLICATIONS

Durini et al., Lateral drift-field photodiode for low noise, high speed, large photoactive-area CMOS imaging applications, Dec. 2010, New Developments in Radiation Detectors—Proceedings of the 11th European Symposium on Semiconductor Detectors, vol. 624, Issue 2, pp. 470-475.*

P. Seitz and A.J.P. Theuwissen (Eds.); "Single-Photon Imaging", Springer Series in Optical Sciences; Feb. 7, 2011; Chapter 1 and 8.

C. Séquin and M. Tompsett; "Charge Transfer Devices", Bell Telephone Laboratories; Academic Press; Sep. 4, 1975.

\* cited by examiner

HIGH-SENSITIVITY X-RAY DETECTOR

RELATED APPLICATIONS

The present application claims the benefit under 35 U.S.C. §119 (e) of U.S. Application 61/599,185 filed on Feb. 15, 2012, the disclosure of which is incorporated herein by reference.

TECHNICAL FIELD

Aspects of disclosed embodiments relate to devices for the sensitive detection of X-rays over large areas, as required for applications in medicine, biology, material research, quality control, non-destructive testing and security.

In particular, embodiments relate to the detection of single X-ray photons, whose position, time of arrival and/or energy must be known with precision.

BACKGROUND

X-ray imaging techniques are essential diagnostic tools in medicine, biology, material research, non-destructive testing and quality control. For a long time, X-ray sensitive films were the preferred means for the acquisition of two-dimensional images of transmitted local X-ray intensity. These X-ray films are increasingly replaced by digital X-ray imaging systems, where the picture is created directly as an electronic image of the X-ray intensity distribution, and no chemical development of a photographic film is required. Such digital detectors can be categorized into three classes:

Image plates, also called CR (Computed Radiography) systems, consist of an X-ray sensitive layer, in which an incident X-ray photon interacts with photostimulable crystals in the CR layers by locally transferring electrons into a semi-stable excited state. Using a scanning laser beam, these states are de-excited in a process called photostimulated luminescence, in which the locally stored energy is released as light flashes. These light flashes can be detected by sensitive photodetectors such as photomultiplier tubes or semiconductor photosensors. Because the X-ray images in a CR system do not appear directly as analog or digital data but rather need an additional readout procedure, the use of CR systems in currently waning.

A second category of X-ray imaging systems is called DR (Direct Radiography). Incident X-rays directly interacting in the bulk of a semiconductor, where they generate mobile electron-hole pairs. One or both types of generated charge carriers are collected and subsequently read out with electronic circuits for the detection of charge packets. The most common semiconductor employed for technical applications is silicon. Therefore, the first DR systems used a silicon layer to absorb and convert the X-rays into charge packets. Unfortunately, silicon has a low atomic number, and it is therefore a comparably inefficient absorber for X-rays. Hence, silicon can only be used as a detector material for DR using X-ray energies of up to about 30 keV, which is insufficient for many medical, technical and non-destructive testing applications. Recently, other semiconductor materials such as germanium, selenium or cadmium-telluride are being used as X-ray detectors because due to their comparatively high atomic numbers they are much better absorbers. Unfortunately, these semiconductor materials are also much more difficult to grow in good quality. Furthermore, since all of these detector materials are read out with silicon-based integrated electronic charge detection circuits, they require a complicated and expensive bump-bonding process to connect the absorption layers with the read-out devices. This difficult fabrication process contributes to the comparably high price of such X-ray imaging systems.

Today, the vast majority of X-ray imaging systems make use of a scintillating layer which converts the incident X-ray photons into pulses of visible light, and an optically coupled array of photodiodes collects the visible light and converts it into electrical signals. Such systems are called I-DR (Indirect Digital Radiography) systems. The required photodiodes can be made of amorphous silicon (thin-film-transistor technology) or of crystalline semiconductors such as silicon, which can also be integrated into ASICs (Application Specific Integrated Circuits).

The advantage of such I-DR systems is that they rely on established and mature fabrication technologies and are therefore very cost-effective. However, the generation of light in a homogeneous scintillator screen is not directed, and therefore it is distributed over a number of photosensor elements in the image sensor which limits the spatial resolution. This can be overcome by the creation of structured scintillation screens with columnar pixels, each covered with highly reflecting material, as disclosed by S. Petterson et al. in the European Patent EP 1,161,693 B1, "X-Ray Pixel Detector and Fabrication Method". However, the preferred image sensor for such a scintillating device is a CCD (Charge-Coupled Device) which depends on clocked charge transport for its operation. As a consequence, it is not possible with such a system to detect the arrival time of a single X-ray photon.

This deficiency can be partly overcome with the invention described by C. S. Levin et al in the U.S. Pat. No. 6,114,703, "High Resolution Scintillation Detector With Semiconductor Readout". This patent discloses the use of columnar parallelepiped scintillation crystals, whose long faces are optically coupled to semiconductor photosensors. Since the area of each photosensor is the same as the area of the crystal's long face, the scintillation light is transmitted homogeneously and completely from the crystal into the photosensor. However, it is known that the detection charge noise of an electronic charge detection circuit is proportional to the effective capacitance of the sense node, as explained for example by P. Seitz and A. J. P. Theuwissen (Eds.), in "Single-Photon Imaging", Springer 2011. For this reason, a large surface of the photosensor device is detrimental to the detection of light pulses with low amplitude, i.e. for the sensitive detection of single X-ray photons with energies in the range of a few 10 keV. For this reason, the X-ray detector described in U.S. Pat. No. 6,114,703 is targeted mainly to applications in PET (Positron Emission Tomography) where the incident X-ray photons have very high energies exceeding 500 keV.

This problem of reduced sensitivity is partially overcome with the X-ray detector architecture described by A. Balan et al. in the United States Patent Application US 2009/0008564 A1, "Modular X-Ray Detector With Single Photon Counting, Energy Sensitivity and Integration Capabilities". By transmitting the scintillation light of a structured scintillation screen through the short face of the columnar elements, and by optically coupling the scintillator screen to a photodiode of small area, the effective noise of the charge detection circuit is reduced. However, the typical area of an X-ray pixel is of the order of 100×100 micrometers, which is significantly larger than the less than 5×5 micrometers encountered in state-of-the-art low noise semiconductor image sensors. As a consequence of this large photosensing area, relatively high charge noise is encountered in these state-of-the-art X-ray detectors; in US 2009/0008564 A1, typical charge noise standard-deviation values of 70-300 electrons are quoted. This is considerably too high for the reliable detection of single X-ray photons in the medically and technically interesting energy range of 10-300 keV, when additional information about the energy of the detected X-ray photon is required simultaneously.

SUMMARY

Embodiments relate to the combination of a structured scintillator screen with a monolithically integrated semiconductor image sensor employing a low capacitance photosensor device and a low noise charge sensitive circuit, allowing the sensitive detection of light flashes produced in the scintillator material.

Embodiments may overcome some of the above-mentioned limitations by providing a device for the sensitive, energy-resolved detection of single X-ray photons, comprising a structured scintillator screen optically coupled to a semiconductor image sensor with small sense node capacitance and low detection charge noise. The scintillator screen comprises individual columnar elements covered with material showing high optical reflection, so that the light flashes produced in a scintillation event are guided along the columnar element. Each columnar element represents a pixel, and the light flashes exit through a short surface of the columnar element for detection with a semiconductor image sensor. The semiconductor image sensor comprises a multitude of photosensor elements, and one or more of these photosensor elements receives light from a columnar pixel of the scintillator screen. Each photosensor element of the image sensor comprises a semiconductor volume in which the incident light pulses create a corresponding number of mobile electron-hole pairs. Photocharge of either type—electrons or holes—are collected by an electric field into photocharge packets. These photocharge are transported by a lateral drift-field device to an electrical sense node of low capacitance. This allows the low-noise conversion of the charge packets into corresponding voltage pulses by an electronic detection circuit, as described for example by C. Lotto et al. in the United States patent application US 2011/0227632 A1, "Charge Pulse Detection Circuit". Three types of output signals can be produced by such an electronic detection circuit: (1) A proportional voltage signal containing information about the arrival time and the energy of the detected X-ray photon, (2) a binary electrical signal containing information about the arrival time of the detected X-ray photon, or (3) a digital signal containing information about the arrival time and the energy of the detected X-ray photon.

BRIEF DESCRIPTION OF THE FIGURES

Non-limiting examples of embodiments are described below with reference to figures attached hereto that are listed following this paragraph. Identical structures, elements or parts that appear in more than one figure are generally labeled with a same numeral in all the figures in which they appear, and a numeral labeling an icon representing a given feature in a figure may be used to reference the given feature. Dimensions of components and features shown in the figures are chosen for convenience and clarity of presentation and are not necessarily shown to scale.

FIG. 5 schematically shows a second embodiment of the electronic circuit for the detection of photocharge packets, wherein at the output of this circuit, a binary signal is produced, whose rising edge occurs at a time related to the arrival time of the X-ray photon; and.

DETAILED DESCRIPTION

It is an object of the present invention to provide a device for the two-dimensional, energy-resolved detection of individual X-ray photons in the energy range of 10-300 keV, which is of interest for applications including, for example, in medicine, biology, material research, security, quality control and non-destructive testing.

It is a further object of invention to provide a device for the two-dimensional, energy-resolved detection of individual X-ray photons, so that this device can be fabricated cost-effectively, by making use of well-known production processes for structured scintillation screens and for semiconductor image sensors based on silicon.

Figure 1:
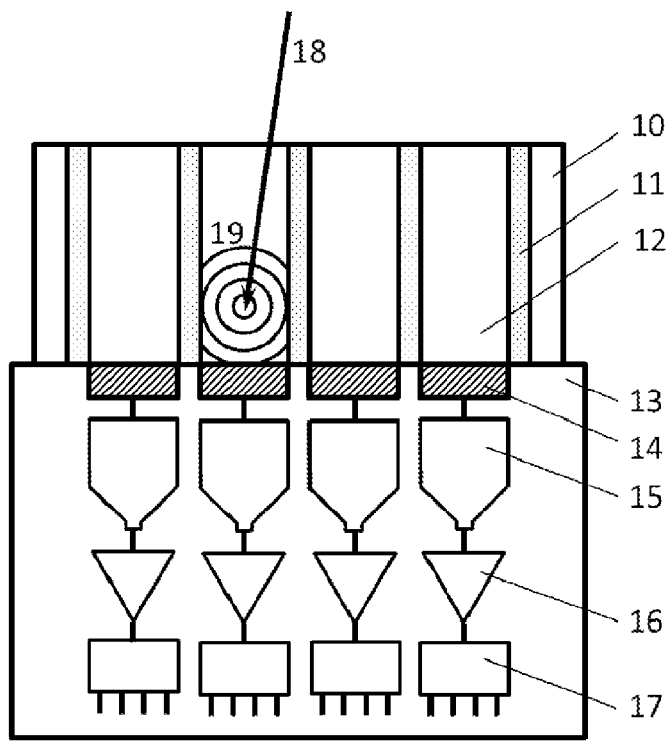
FIG. 1 schematically shows a schematic diagram of the sensitive X-ray detector comprising a structured scintillator screen, a semiconductor photodetector with small effective charge detection capacitance and a low-noise charge pulse detection circuit.

With respect to FIG. 1, this is accomplished with a structured scintillator screen 10 which is optically coupled to a semiconductor image sensors 13. Scintillator screen 10 is structured into columnar elements 12, covered on all sides except the bottom side with a highly reflective material 11. Each columnar element 12 is optically coupled to one or more photosensor devices in semiconductor image sensor 13. Incident X-ray photon 18 is converted into flash of light 19, which is guided in the columnar structure to one or several photosensor devices in the semiconductor image sensor.

This photosensor device comprises a photoconversion device 14, which converts incoming light flashes into proportional numbers of electron-hole pairs. One type of photocharges is collected in the device's electrical field producing photocharge packets. Embodiments of photoconversion device 14 can be embodied, for example, by photodiodes, CCDs, photogate devices, and/or PPDs (pinned photodiodes). These photosensor devices can be used in front-side or backside illumination mode. In order to collect photocharge over the comparatively large area of semiconductor photosensor 13, a lateral drift field device 15 is employed, accumulating photocharge packets and transporting them to the sense node of an electronic charge detector circuit or charge detector 16. In this way, the effective capacitance of the sense node is kept to a minimum, independently of the area over which photocharge is being collected.

Charge detector circuit 16 converts photocharge packets at its input node into an electrical signal, and because of the low capacitance of the sense node, the standard-deviation charge noise of this circuit can be kept to low values of, for example, about 10 electrons.

The electrical signal of charge detector circuit 16 is processed by a signal processing circuit 17, producing an analog output signal containing information on the time of arrival and the energy of the detected X-ray photon, and/or a binary signal containing information on the time of arrival of the detected X-ray photon, and/or producing a digital output signal containing information on the time of arrival and the energy of the detected X-ray photon.

Figure 2:
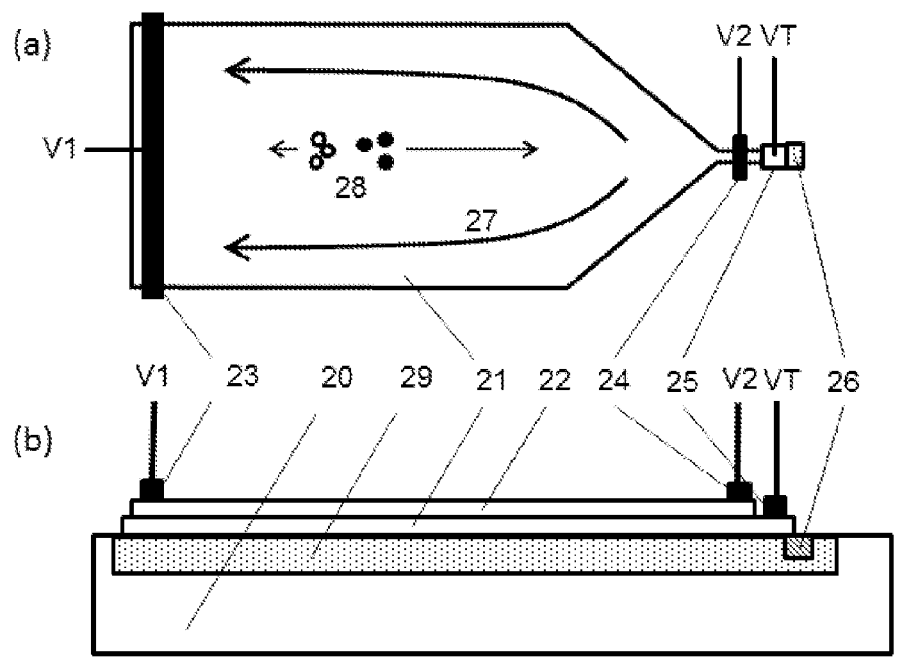
FIG. 2a schematically shows a top view of the lateral drift field device for the collection of photocharge packets according to a first embodiment.
FIG. 2b schematically shows a cross-sectional view of the lateral drift field device, according to the first embodiment.
Figure 3:
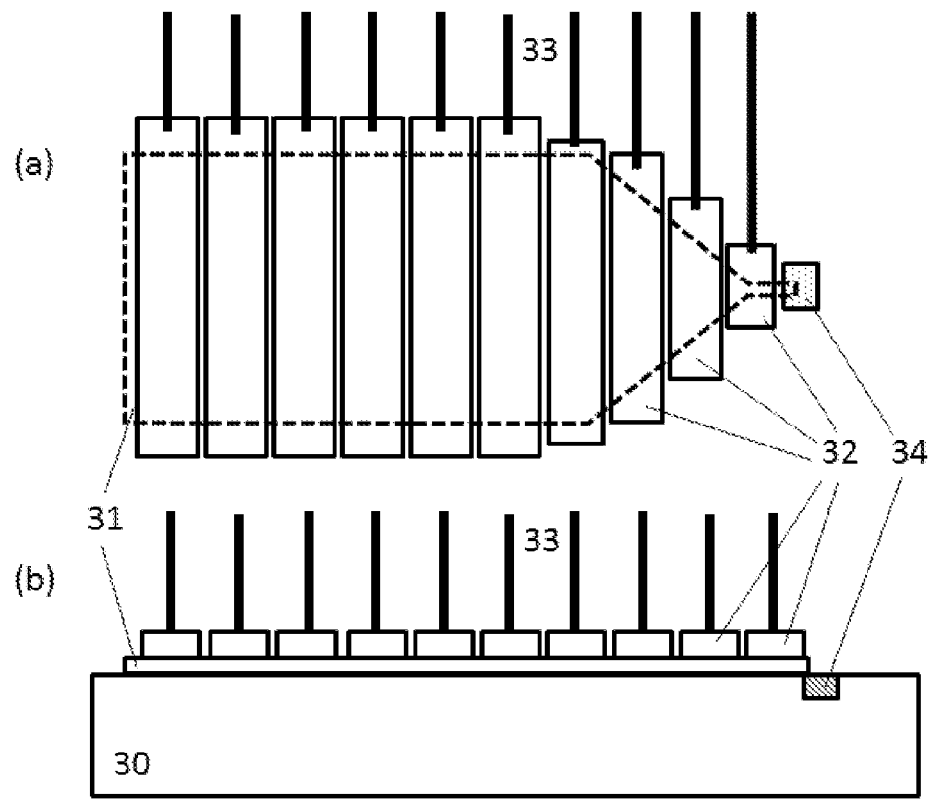
FIG. 3a schematically shows a top view of a lateral drift field device for the collection of photocharge packets according to a second embodiment.
FIG. 3b schematically shows a cross-sectional view of the lateral drift field device, according to the second embodiment.

Embodiments of lateral drift field device 15 include, for example, the resistive gate device schematically illustrated in FIG. 2 and the multi-electrode device schematically illustrated in FIG. 3.

The resistive gate device comprises a semiconductor substrate 20, on top of which an insulator oxide 21 is fabricated. Insulator oxide 21 is shaped such that charge packets 28 can be transported in a lateral electrical field 27 to a diffusion 26, which is part of the sense node of charge detector 16. This is accomplished with a layer of high-resistivity material 22 on top of insulator oxide 21. High-resistivity material 22 is contacted on one end by an electrode 23 and on the other end by another electrode 24. This generates an lateral electric field 27 in the resistive gate, and a similar electric field is generated at the surface of semiconductor substrate 20. An optional buried channel implant 29 can improve the charge transport efficiency, as explained for example by C. Sequin and M. Tomsett in "Charge Transfer Devices", Academic Press 1975. Without loss of generality, it is assumed that substrate 20 is of p-type and buried channel 29 of n-type. Therefore, if electrodes 23 and 24 are kept at sufficiently positive voltages, buried channel 29 and a part of substrate 20 are depleted, and electrons are transported laterally under the influence of lateral electric field 27. If electrode 23 is kept at low potential V1 and electrode 24 is kept at high potential V2, packets of photogenerated electrons move towards diffusion 26. A transfer gate 25 is biased to the potential VT, and if VT is higher than V2, electron packets move under transfer gate 25. If diffusion 26 has previously been biased to a potential exceeding VT and is floating afterwards, electron packets move to diffusion 26, as required to the sense node of charge detection circuit 16.

The multi-electrode device comprises a semiconductor substrate 30 with optional implanted buried channel, covered by insulating layer 31. On top of insulator a series of closely spaced or overlapping electrodes 33 is fabricated. Without loss of generality, it is assumed that substrate 30 is of p-type. Therefore, if all electrodes 33 are kept at sufficiently positive voltages, buried channel and part of substrate 30 are depleted, and electrons are transported laterally under the influence of lateral electric fields created with electrodes 33. By biasing electrodes 33 with a monotonously rising series of voltage values, a lateral electric field is created in which packets of photogenerated electrons move towards diffusion 34. A transfer gate 32 is biased to a potential larger than the potential on any other of the electrodes 33, and a diffusion 34 has previously been biased to a potential exceeding the potential at transfer gate 32 and is floating afterwards, so that electron packets move to diffusion 34. Diffusion 34 is part of the sense node of charge detection circuit 16.

Figure 4:
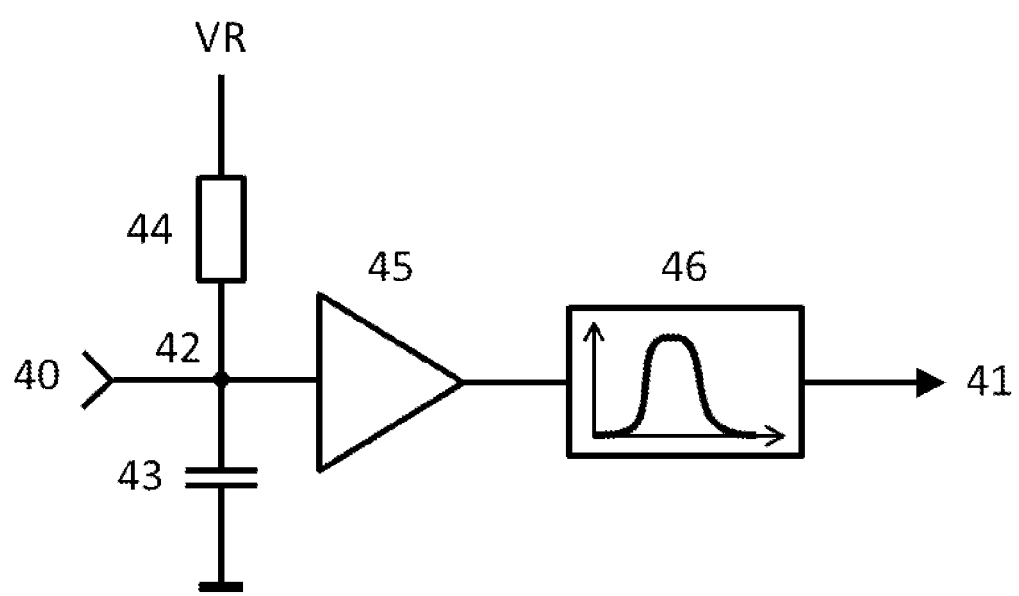
FIG. 4 schematically shows a first embodiment of the electronic circuit for the detection of photocharge packets, wherein at the output of this circuit, an analog voltage pulse is generated, whose amplitude is related to the energy of the generating X-ray photon and whose maximum occurs at a time related to the arrival time of the X-ray photon.

Charge detector circuit 16 must exploit the fact that the effective capacitance of the sense node is very small, while keeping the additional noise generated by all other electronic elements to a minimum. This may be accomplished with a circuit described by C. Lotto et al. in the United States patent application US 2011/0227632 A1, "Charge Pulse Detection Circuit". The principle is illustrated in FIG. 4. An input 40 is connected to diffusion 26 or 34, respectively, of lateral field drift device 15. A sense node 42 obtains the charge pulses created in photosensor device 14, and through an effective input capacitance 43 of a sense node 42, the charge pulse at input 40 creates a corresponding voltage pulse at sense node 42. This voltage pulse is buffered or amplified by an amplifier 45. Bandpass filter 46 passes only those frequencies required to retain the essential components of the signal; low frequencies are completely cancelled, since only pulse spike information is desired, and high frequencys are also cancelled, because more circuit noise than useful signal information is contained. Signal charges at sense node 42 are drained away continuously through a resistance 44 connected to reference voltage VR. At an output 41 of the charge detection circuit schematically shown in FIG. 4, an analog voltage signal is produced, whose amplitude is proportional to the amplitude of the photocharge pulse at input 40, which is proportional to the energy of the detected X-ray photon at the origin of the photocharge pulse. The centroid of the analog voltage signal is directly related through a temporal offset to the time-of-arrival of the detected X-ray photon.

Figure 5:
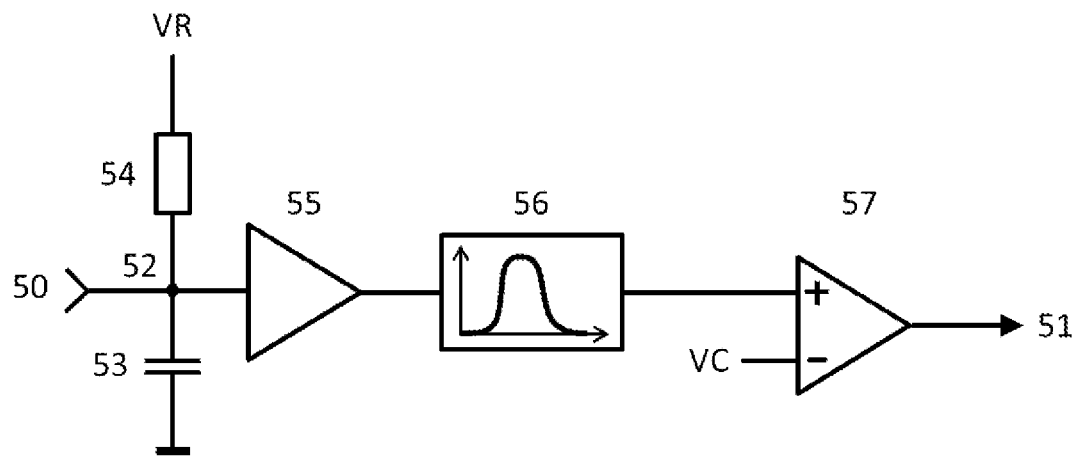

Signal processing circuit 17 is selected according to the desired output of the photosensor device. If an analog voltage signal is desired, containing information about the energy and the time of arrival of the detected X-ray photon, then a conventional buffer or amplifier circuit is sufficient, because charge pulse detection circuit 16 schematically illustrated in FIG. 4 is providing the desired signal. If only a binary signal is desired, used for counting the number of X-ray photons incident on the high-sensitivity X-ray detector, then a comparator circuit with a subsequent pulse counter is sufficient. In FIG. 5 a combination of charge detection and comparator circuits is illustrated. The inverting input of a comparator 57 is connected to reference potential VC, and as long as the analog voltage signal coming from a bandpass filter 56 is larger than VC, a digital "HIGH" signal is reported at an output 51 whose rising edge occurs at a time related to the arrival time of the X-ray photon. Multiple comparator circuits 57 with different VC voltages can be implemented in parallel.

Figure 6:
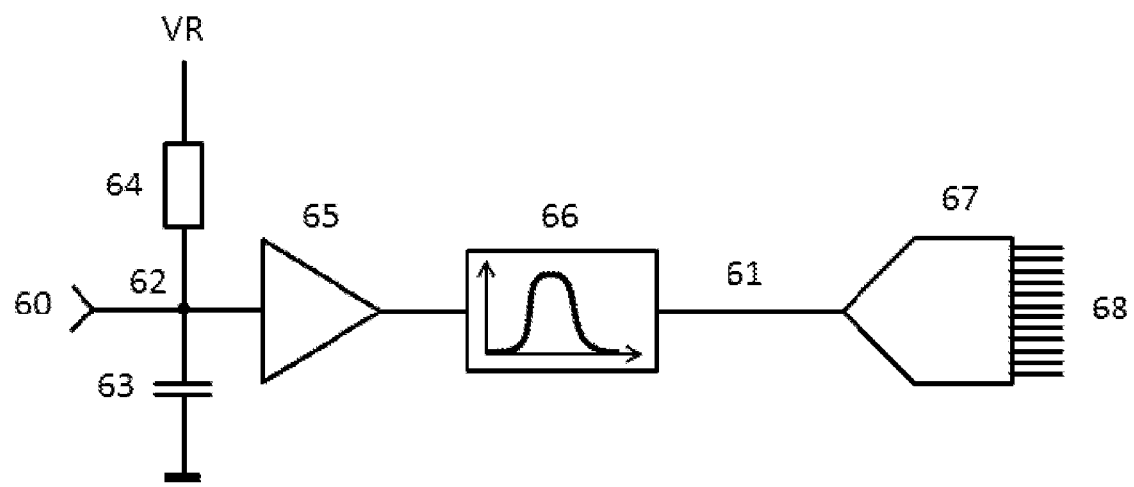
FIG. 6 schematically shows a third embodiment of the electronic circuit for the detection of photocharge packets, wherein at the output of this circuit, a digital signal is generated, whose value is related to the energy of the generating X-ray photon and whose time of emergence is to the arrival time of the X-ray photon.

FIG. 6 schematically shows an additional embodiment where an analog voltage pulse 61 is fed into an ADC (analog-to-digital converter) 67, whose digital output signal 68 contains information about the pulse height of analog pulse 61, which is related to the incident X-ray photon's energy, and whose digital output signal 68 contains information about the X-ray photon's arrival time.

The invention claimed is:

1. A device for the sensitive detection of X-ray photons comprising a structured scintillator screen optically coupled to a monolithically integrated semiconductor image sensor wherein:
   the scintillator screen is structured into columnar elements whose surfaces are partially covered with highly reflective material;
   the semiconductor image sensor comprises individual pixels, and each of the scintillator screen's columnar elements emits its scintillation light onto one or several of these pixels; and
   the pixel comprises a photoconversion device in which incident light is converted into a corresponding packet of charges, a charge collection device in which a lateral electric field is employed for transporting the photogenerated charge packets to a readout node, and an electronic circuit for converting these charge packets to voltage signals responsive to which arrival-time and/or energy of detected X-ray photons is determined,
wherein the charge collection device is a lateral drift field device, and
wherein the lateral drift field device is a multi electrode device comprising a series of closely spaced or overlapping electrodes.

2. The device according to claim 1, wherein the photoconversion device is selected from a group consisting of: photodiodes, CCDs (charge coupled devices), photogate devices and PPDs (pinned photodiodes), any of which can be used in front-side or backside illumination mode.

3. The device according to claim 1, wherein the lateral drift field device is a resistive gate device.

4. The device according to claim 1, wherein the electronic circuit is a charge detector circuit having an input sense node and a buffering or amplifying amplifier featuring minimum additional noise generation.

5. The device according to claim 4, wherein a bandpass filter is connected to the output of the amplifier.

6. The device according to claim 5, wherein the output of the charge detector circuit is connected to a comparator circuit for producing a binary signal containing arrival-time information on the incident X-ray photon.

7. The device according to claim 5, wherein the output of the charge detector circuit is connected to an analog-to-digital converter for producing a digital signal whose value is related to the energy of the generating X-ray photon and whose emergence contains information about the X-ray photon's arrival time.

8. The device according to claim 1, wherein the photoconversion device is operative to convert light that is in a spectrum or combination of spectra selected from a group consisting of: the visible, the near-infrared and the near ultraviolet electromagnetic radiation spectrum.

* * * * *